US008990710B1

(12) United States Patent
Warner et al.

(10) Patent No.: US 8,990,710 B1
(45) Date of Patent: Mar. 24, 2015

(54) BUILDING NATIVE COMPUTER APPLICATIONS USING A BROWSER PLATFORM

(75) Inventors: Craig Warner, Palo Alto, CA (US); Luke Greenley Stone, Menlo Park, CA (US); Alex Knowles, Santa Cruz, CA (US)

(73) Assignee: Google Inc., Mountain View, CA (US)

( * ) Notice: Subject to any disclaimer, the term of this patent is extended or adjusted under 35 U.S.C. 154(b) by 272 days.

(21) Appl. No.: 13/600,119

(22) Filed: Aug. 30, 2012

(51) Int. Cl.
*G06F 3/00* (2006.01)
*G06F 9/44* (2006.01)

(52) U.S. Cl.
CPC .................................. *G06F 8/20* (2013.01)
USPC ........................................................ 715/760

(58) Field of Classification Search
CPC ........................... G06F 9/4443; G06F 17/3089
USPC ................................................ 715/762, 745
See application file for complete search history.

(56) References Cited

U.S. PATENT DOCUMENTS 6,091,409 A 7/2000 Dickman et al.

OTHER PUBLICATIONS

Garrett, "Adaptive path—Ajax: A New Approach to Web Applications," Feb. 18, 2005, <http://adaptivepath.com/publications/essays/archives/000385.php>.
"Google Code—Gadgets API Development Fundamentals," 2011.
Smith, "Simplifying Ajax-Style Web Development," Computer, May 2006, pp. 98-101.
Tailalsaari, et al., "Web Browser as an Application Platform: The Lively Kernel Experience," SMLI TR-2008-175, Jan. 2008, Sun Microsystems.

*Primary Examiner* — Omar Abdul-Ali
(74) *Attorney, Agent, or Firm* — McDermott Will & Emery LLP

(57) ABSTRACT

In one aspect, the subject disclosure can be embodied in a method for building desktop applications using a web browser platform is provided. A content type and a location of a web application is determined based on input from a user via an input field. Application data for the web application is retrieved based on the determined content type and location of the web application. Parameters for a browser platform application to be generated for the web application are identified, and the browser platform application is generated based on the retrieved application data and the identified parameters.

19 Claims, 7 Drawing Sheets

Link Mode
(demo -load "http:\\foo.com\")

Local Mode
(demo -local c:/foo.file)

BUILDING NATIVE COMPUTER APPLICATIONS USING A BROWSER PLATFORM

BACKGROUND

The present disclosure relates generally to application programs, and particularly, to web-based applications.

Product distribution partnerships between different software companies have grown in recent years. In a typical arrangement of such a partnership, product features or services provided by one company are integrated or bundled together with a product, for example, a software application program, developed and distributed to end users by another company. For example, an application program (e.g., a web browser) developed by one company may include a search toolbar for performing web searches via a web search engine of a partner company. Such a product distribution partnership may be mutually beneficial for both companies, as integrating product features from one partner company into the products of another may add value to the existing products and services offered by each company.

However, integrating product features or services provided by one company into an existing product (e.g., standalone application program) of another may be a complex and expensive process for one or both companies in terms of product development and support costs. Such costs may include, for example, implementation costs associated with customizing the application program and bundled features for a particular operating system or type of computing device. Further, compatibility issues may arise when a new product update released for either the application program or bundled feature component is installed for an existing version of such a bundled application program.

SUMMARY

The disclosed subject matter relates to building native application programs for different types of computing devices via a web browser platform. In an example method, a content type and a location of a web application are determined based on input from a user via a first input field. Application data for the web application is retrieved based on the determined content type and location of the web application. Parameters are identified for a browser platform application to be generated for the web application. The browser platform application is then generated based on the retrieved application data and the identified parameters. At least one unique identifier is embedded within the browser platform application being generated so as to track usage of the generated browser platform application. An end user's interaction with the generated browser platform application is tracked upon receiving at least one notification including the embedded unique identifier from a computing device of the end user at which the browser platform application is installed.

The disclosed subject matter also relates to a machine-readable medium comprising instructions stored therein, which when executed by a system, cause the system to perform operations comprising: determining a content type and a location of a web application based on input from a user via a first input field; retrieving application data for the web application based on the determined content type and location of the web application; identifying parameters for a browser platform application to be generated for the web application, based on input received from the user from the user via one or more second input fields; generating a user interface including a plurality of user control elements for the browser platform application to be generated; embedding a unique identifier within at least one of the plurality of user control elements of the generated user interface of the browser platform application to be generated; generating the browser platform application with the user interface including the embedded unique identifier, based on the retrieved application data and the identified parameters for the browser platform application; and tracking an end user's interaction with at least one of the plurality of user control elements of the user interface of the generated browser platform application based on a notification including the unique identifier received from a computing device of the end user, at which the browser platform application is installed.

The disclosed subject matter further relates to a system including at least one processor and a memory device accessible to the processor, the memory device including processor-readable instructions, which when executed by the processor, configure the processor to perform functions to: determine a content type and a location of a web application based on input from a user via a first input field; retrieve application data for the web application based on the determined content type and location of the web application; identify parameters for a browser platform application to be generated for the web application, based on input received from the user from the user via one or more second input fields; generate a user interface including a plurality of user control elements for the browser platform application to be generated, based on the retrieved application data and the identified parameters, wherein a different unique identifier is embedded within each of the plurality of user control elements of the generated user interface for the browser platform application to be generated; generate an installation file for an end user to install the generated browser platform application including the user interface with the embedded unique identifier at a computing device of the end user; and track the end user's interaction with the browser platform application, upon receiving at least one notification message including the embedded unique identifier from the end user's computing device, at which the generated browser platform application is installed.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The novel features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent that the subject technology is not limited to the specific details set forth herein and may be practiced without these specific details. In some instances, well-known structures and components are shown in block diagram form in order to avoid obscuring the concepts of the subject technology.

The disclosed subject matter describes systems and techniques for building or generating a native or standalone version of a conventional web application via a web browser based development platform (or "browser platform"). As will be described in the examples provided below with respect to FIGS. 1-6, this may include using a web browser as a development platform to build and deploy such standalone browser based applications (also referred to herein as "browser platform" or "native browser platform" applications). For example, a conventional web application is generally executable only from a web browser executed at a computing device of a user. Thus, the techniques of the subject disclosure may be used to convert such a conventional web application to a browser based or browser platform application, which can be executed at the user's device as a native or standalone application at the particular type of computing device.

In one example, an existing or conventional web application is encapsulated in a fully-functioning standalone application that operates external to the web browser on a user's device. As such, such a native or standalone browser platform application may be executed without requiring the user to launch a separate web browser at the computing device. The user may thus launch the application using the same process for launching a standard application program, e.g., by selecting an icon associated with the installed application that appears on a home screen or desktop of the user's device. A benefit of developing such browser platform applications from conventional or existing web applications includes providing users (e.g., application developers or end users) a capability to configure, build and download standalone versions of web applications more quickly and easily relative to conventional solutions. Furthermore, a benefit for application developers in particular includes the ability to bundle application features and services provided by a service provider or application vendor, for example, as part of a product distribution partnership agreement between each developer and the service provider.

Figure 1:
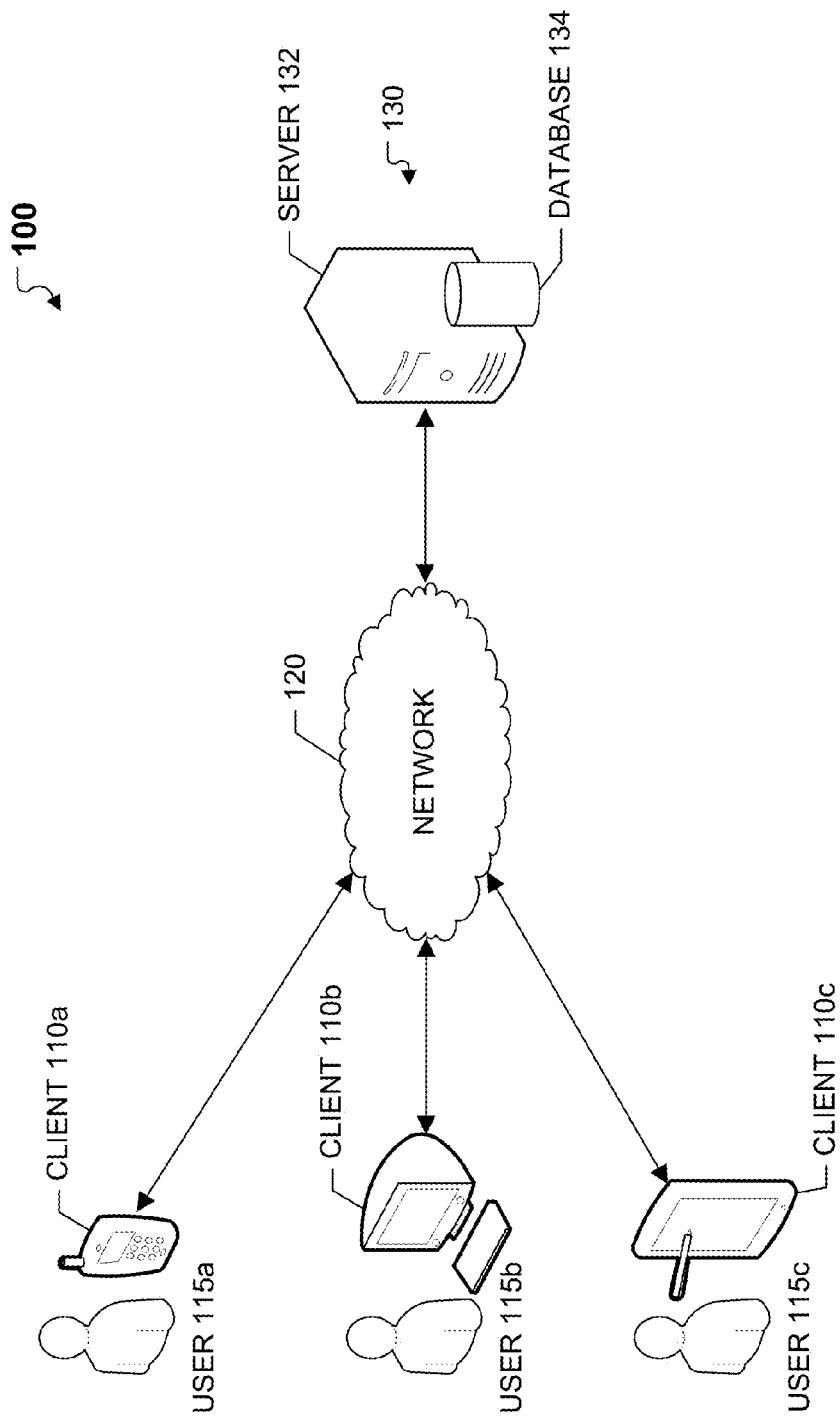
FIG. 1 illustrates an example network environment for building native application programs for different types of computing devices using a web browser based development platform.

FIG. 1 illustrates an example network environment 100 for building native application programs for different types of computing devices using a web browser based development platform. In the example shown in FIG. 1, network environment 100 includes client devices 110a, 110b and 110c (hereinafter "clients 110a-c"), and a computing system 130. Clients 110a-c communicate with one or more servers 132 of computing system 130, for example, through network 120. Users 115a, 115b and 115c (hereinafter "users 115a-c") may use clients 110a-c to invoke the functionality provided by an installer builder utility or web service hosted at, for example, server 132 via an online user interface provided at each of clients 110a-c, respectively.

As will be described in further detail below, the installer builder web service may be used to build an installer file for installing a fully functional native computer application, which may be referred to herein as a "browser platform application," based on an existing website or conventional web application. As noted above, such a conventional web application is generally accessible only through a separate web browser, and thus requires a user to launch the web browser in order to access the features of the web application. However, the techniques of the subject disclosure enable a native version of the web application to be generated for a browser based platform such that the native version is executable as a standalone application at the user's computing device (e.g., any of clients 110a-c). For example, in response to input from users 115a-c via the interface for the installer builder, each of clients 110a-c may initiate one or more communication requests directed to server 132 of computing system 130 via network 120. Such communication requests may include web requests in the form of, for example, Hypertext Transfer Protocol (HTTP) requests. The online interface for the installer builder service may be provided, for example, in the form of one or more web pages loaded in a web browser executable at each of the respective clients 110a-c. Users 115a-c may communicate with clients 110a-c via one or more user input devices coupled to each of clients 110a-c. Examples of such a user input device may include, but are not limited to, a mouse, keyboard, microphone or touch-screen display.

Computing system 130 includes at least one server device 132 that is communicatively coupled to at least one computer-readable storage device or database 134. Although only server 132 and database 134 are shown, additional servers and/or databases may be used as may be necessary or desired for a particular implementation. Database 134 may store any type of data accessible by server 132. Such data may include, for example and without limitation, data for one or more web applications or services provided by computing system 130. In an example, computing system 130 may be used to host an installer builder web service, as described above. As will be described in further detail below, the installer builder service may include a user interface for each of users 115a-c that may be accessible, for example, through network 120 via a web browser or other application executable at each of clients 110a-c. The interface may be used by users 115a-c to configure options or settings for automatically generating a native or standalone version of a web application program executable at clients 110a-c, respectively, without requiring users 115a-c to launch a separate web browser.

As shown in the example of FIG. 1, clients 110a-c represent different types of computing devices. For example, client 110a may be a mobile computing device (e.g., a mobile handset or smart-phone device), client 110b may be a desktop computing device and client 110c may be a tablet computer. However, the techniques as described herein are not intended to be limited to these example devices, and thus, each of clients 110a-c can be implemented using any general-purpose computer with a processor, local memory, a display, and one or more input devices, e.g., a keyboard or a mouse. Examples of such different computing devices that may be used to implement any of clients 110a-c include, but are not limited to, a desktop computer, a laptop computer, a handheld computer, a personal digital assistant (PDA), a cellular telephone, a network appliance, a camera, a smart phone, an enhanced general packet radio service (EGPRS) mobile phone, a media player, a navigation device, an email device, a game console, set-top box, television (e.g., a "smart" television having a processor and memory for executing and storing instructions) or a combination of any these data processing devices or other data processing devices. Alternatively, each of clients 110a-c can be a specialized computing device, for example, a mobile handset or tablet computer. Similarly, server 132 can be implemented using any general-purpose computer capable of serving data to any of clients 110a-c. Examples of computing devices that may be used to implement server 132 include, but are not limited to, a web server, an application server, a proxy server, a network server, or a group of computing devices in a server farm.

In some aspects, the computing devices may communicate wirelessly through a communication interface (not shown), which may include digital signal processing circuitry where necessary. The communication interface may provide for communications under various modes or protocols, e.g., Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. For example, the communication may occur through a radio-frequency transceiver (not shown). In addition, short-range communication may occur, e.g., using a Bluetooth, WiFi, or other such transceiver.

In some aspects, network environment 100 can be a distributed client/server system that spans one or more networks, e.g., network 120. Network 120 can be any network or combination of networks that can carry data communication. Such a network can include, but is not limited to, a cellular network, a local area network, medium area network, and/or wide area network, e.g., the Internet, or a combination thereof for communicatively coupling any number of mobile clients, fixed clients, and servers. In some aspects, each of clients 110a-c can communicate with server 132 via a virtual private network (VPN), Secure Shell (SSH) tunnel, or other secure network connection. In some aspects, network 120 may further include a corporate network (e.g., intranet) and one or more wireless access points.

Figure 2:
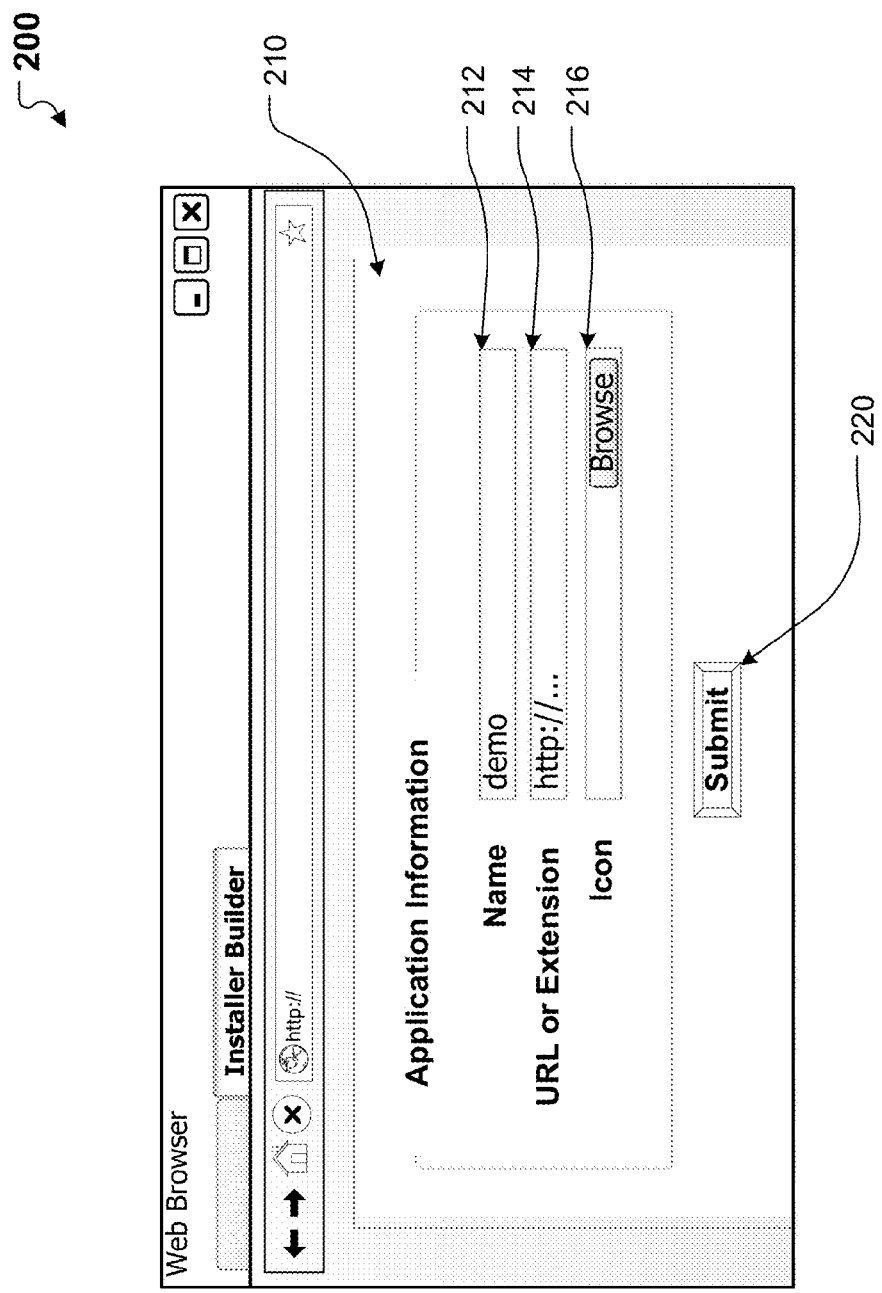
FIG. 2 illustrates an example graphical user interface of a web browser for accessing the functionality of an installer builder web service via a web page loaded within the browser.

FIG. 2 illustrates an example graphical user interface (GUI) 200 for an installer builder service accessible via one or more web pages loaded within a web browser executable at a computing device of a user. The installer builder in this example may be implemented as a web service hosted at a web server (e.g., server 132 of FIG. 1, as described above). The installer builder interface may be provided to a user via one or more web pages loaded within the web browser executing at a client device (e.g., any of clients 110a-c of FIG. 1) of the user. It will be assumed for purposes of this example that the user is an application developer of a web application. However, it should be noted the techniques described herein are not intended to be limited thereto and that the installer builder service may be provided to an end user of the particular web application that is being converted to a standalone or native browser platform application.

As shown in FIG. 2, GUI 200 includes a web form 210 displayed within a content area of the web browser. The web browser and GUI 200 may be viewed by the user at the client device via display or rendering device coupled to the client device. Such a display or rendering device can include, but is not limited to, a touch-screen display, a cathode ray tube (CRT) monitor, light-emitting diode (LED) display or liquid crystal display (LCD) screen. The user can also interact with GUI 200 to perform various tasks including, for example, directing the web browser executing at the user's device to a web site associated with the installer builder web service. GUI 200 receives user input from one or more input devices, for example, a mouse, keyboard, microphone or touch screen display coupled to the client device. The received user input may include values entered by the user for various installer builder options or parameters corresponding to user fields 212, 214 and 216 of web form 210.

In an example, the installer builder service generates the browser platform application based on the particular web application and other parameters specified by the user via user fields 212, 214 and 216. As shown in FIG. 2, user field 212 may be used to specify a name (e.g., "demo") of the browser platform application to be generated. User field 214 may be used to specify a source or location of the web application. In the example GUI 200 shown in FIG. 2, the location specified by the user (e.g., application developer) via user field 214 may be a universal resource locator (URL) address specifying the location of the web application to the installer builder. The specified URL may correspond to, for example, a web site associated with the web application.

In a further example, the user may provide the name of a browser extension via user field 214 instead of a web site URL corresponding to the web application. Such a browser extension may include, for example and without limitation, an plug-in or add-on installed at the user's device so as to extend the functionality of a web browser also installed and executable at the device. Further, such a browser extension may be used to execute the web application using any combination of various programming, scripting or markup language elements including, but not limited to, Hypertext Markup Language (HTML) and JavaScript. In addition, application data and other information associated with the browser extension may be stored within a file or folder (e.g., browser extensions folder) associated with the web browser in a local data store of the user's computing device. The locally stored data for the web application may include, but is not limited to, a network link or address corresponding to a web site or additional application data related to the functionality of the web application. Accordingly, the user may use user field 214 to specify a name and location of a local file corresponding to the particular browser extension. Also, as shown in GUI 200 of FIG. 2, the user may specify via user field 216 a location and filename of a selected image file to be used as the application icon. The image file may be stored locally at the user's computing device or in a remote network location.

It should be noted that user fields 212 or 216 may be optional application parameters and the browser platform application may be generated for based on the location of the original application, as specified in user field 214, and a default application name and/or icon. Although only user fields 212, 214 and 216 are shown in FIG. 2, other user fields may be displayed for additional application parameters. Examples of such additional parameters may include, but are not limited to, a destination address or location for storing or sending the generated installation file and one or more different types of computing devices or platforms for generating one or more corresponding device or platform-specific installation files. Further, application parameters and corresponding user fields may be provided for any other application properties with respect to installing or executing the browser platform application for a particular type of computing device or platform. In an example, an additional parameter that may be specified via a user field of GUI 200 may include an option to configure one or more modes of operation for the browser platform application to use while it executes at the user's computing device as will be described in further detail below with respect to FIGS. 5A-5C.

Once the user has specified the location of the web application via user field 214 and entered the additional (or optional) application parameters via user fields 212 and 216, the user may invoke the generation of the browser platform application by selecting a control button 220. In response to user input via control button 220, the installer builder automatically generates an installation file for the browser platform application based on these application parameters, as specified by the user. In some implementations, the installer builder service determines a content type and a location of the conventional web application to be converted based on the user input received via user field 214. The content type of the web application may be based on, for example, whether the web application is a browser extension installed for a web browser at the user's device (e.g., user field 214 includes a name of a browser extension or location of a locally stored data file corresponding to the extension) or a conventional web application accessible via a web site or web page via a web browser (e.g., user field 214 includes a URL associated with the web application, as described above).

Figure 3:
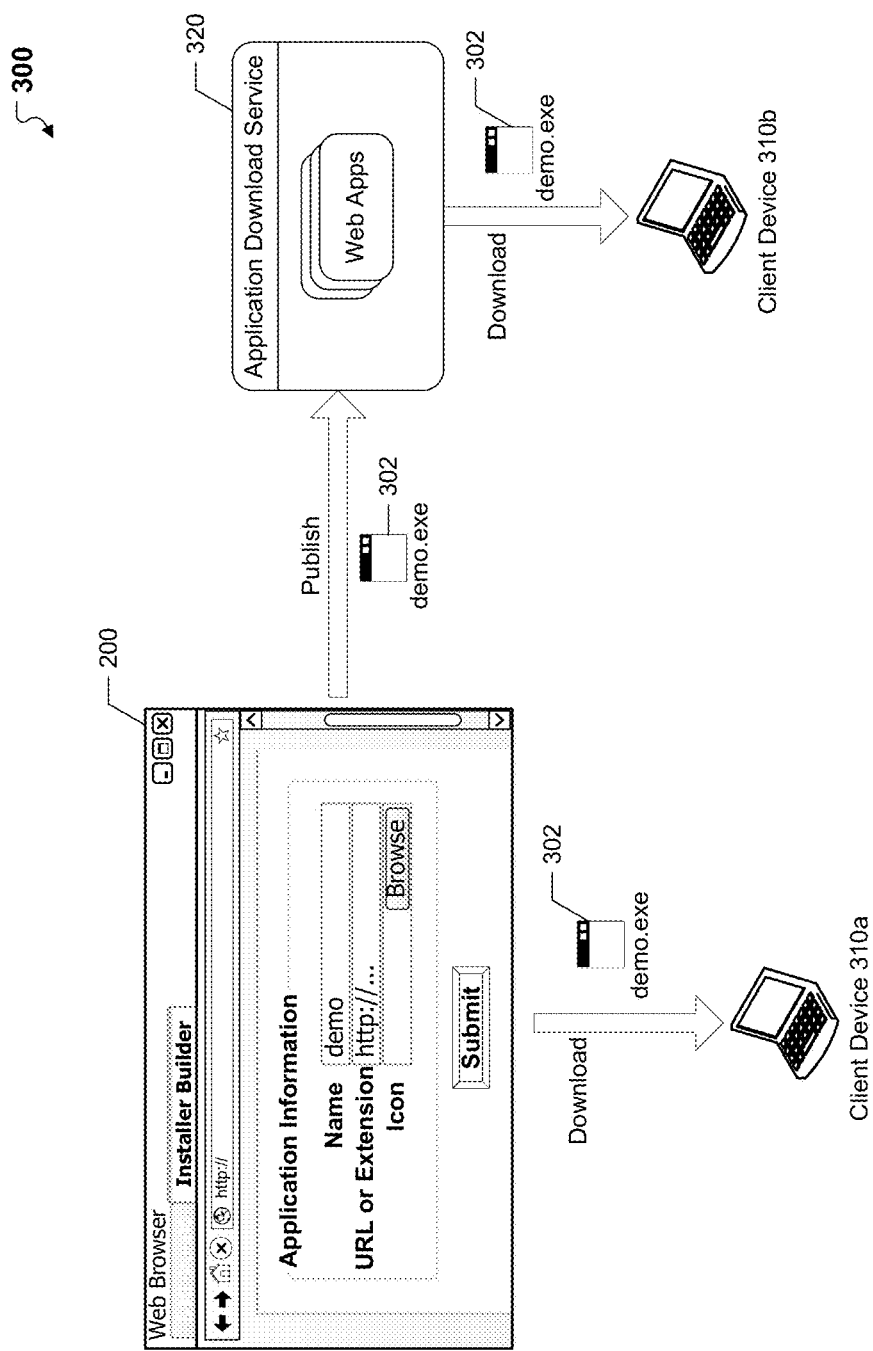
FIG. 3 illustrates an example process for building and distributing a native browser platform application installer file using the installer builder interface of FIG. 2.

As shown in FIG. 3, the generated browser platform application or installation file 302 for the browser platform application may be downloaded directly to the user's device (e.g., a client device 310a). Alternatively, the generated installer file 302 may be published to an application download service 320, e.g., a virtual store or marketplace for distributing web applications to third-party users. A third-party or end user of the browser platform application may download a copy of the published installer file 302 via an interface provided by the application download service 320 to the end user's device (e.g., a client device 310b). Each of client devices 310a and 310b may be implemented using any general-purpose or specialized computing device having a processor, local memory, a display and one or more input devices, e.g., a keyboard, mouse or touch-screen display. Referring back to FIG. 1, client devices 310a and 310b may be implemented using, for example, any of client devices 110a-c, as described above.

In an example, application download service 320 may include different versions of the installer file for different types of computing devices or platforms, as described above. In some implementations, the installer builder may be integrated with the application download service 320, thereby providing end users of the application download service 320 with an option of accessing the particular application as a conventional web application within the end user's web browser in addition to an option for converting the conventional web application into a browser platform application, as described herein, which the user may install and launch at the user's device without the user having to launch the web browser separately.

Figure 4:
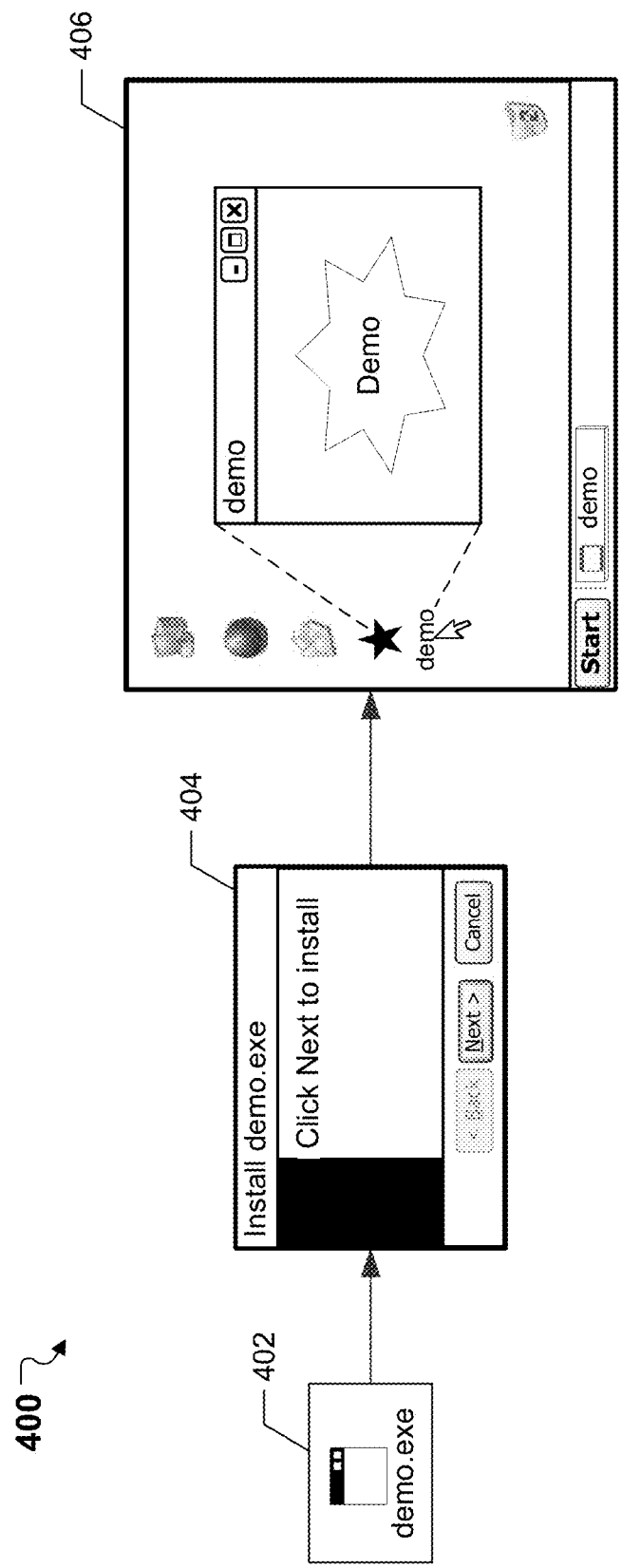
FIG. 4 illustrates an example user process for installing and executing a native browser platform application as a standalone application at a computing device.

As described above, the installation file may be used to install the generated browser platform application at a particular type of computing device of the user. FIG. 4 illustrates an example user process 400 for installing and executing the converted web application as a native browser platform application or standalone application at the user's computing device (e.g., any of client devices 110a-c of FIG. 1 or client device 310a or 310b of FIG. 3, as described above). In step 402 of the example process 400, a user has downloaded an installer or installation file (e.g., "demo.exe") that can be used to install the browser platform application at the user's computing device. For example, the installation file may be downloaded and saved to a local memory or storage at the user's computing device. The user may install the browser platform application in a similar manner as other types of application programs at the user's computing device. Thus, as shown in step 404, the installation of the browser platform application may include standard install screens or pages in an interactive dialog window displayed to the user at the user's computing device.

Once installed at the user's device, an icon may be displayed for the browser platform application (e.g., at a desktop or home screen of the operating system of the device) alongside other icons for applications or other device or operating system-specific items, as shown by the example illustrated for step 406. Also, as shown for step 406, the user may launch the browser platform application using the same process for launching a standard application program at the device, e.g., by selecting an icon associated with the installed application, as it appears on a home screen or desktop of the user's device (e.g., by double-clicking with a mouse or other pointing device or double-tapping with the user's finger via touch-screen display).

In some implementations, the browser platform application may be configured to send an embedded identifier to an application server over network based on a particular event or user activity. Examples of such events or activities may include, but are not limited to, the initial installation or launch of the application at the user's device or the user's selection of an advertisement or other link included in the application. Such an event may be triggered automatically based on a predetermined period of time related to the use of the application at the user's device. The occurrence of each event, e.g., as signaled by the receipt of the unique tracking identifier at the application server, may be tied to, for example, a business process used to generate revenue for the application developer.

Referring back to GUI 200 of FIG. 2, an application developer may provide the installer builder service, as described above, with one or more unique identifiers associated with the particular application developer or browser platform application being generated, e.g., via one or more additional user fields provided in GUI 200 for this purpose. The installer builder may then embed these unique identifiers within the generated browser platform application. The unique identifier(s) can be used to track or monitor user activity in association with the distribution of the browser platform desktop application. Such tracking capability enables a business, e.g., the application developer, to generate revenue or other benefits from the distribution and use of the browser platform application.

In an example, the generated browser platform application may be configured to return the embedded unique identifier upon initial launch or execution at the user's computing device. In a further example, the browser platform application may be generated with a user interface including a plurality of user control elements that may be used to track the different types of user interaction with respect to the browser platform application as it executes at the user's device. For example, the unique identifier(s) associated with the generated browser platform application may be embedded within one or more of the user control elements of the user interface. In some implementations, a different unique identifier may be used for different user control elements so as to track a particular type of user interaction. For such tracking purposes, the generated browser platform application may be configured to transmit or return, e.g., to an application server associated with the installer builder service or the developer of the original web application, the embedded unique identifier associated with the browser platform application (or particular user control element of the browser platform application) in response to relevant user input. The unique identifier(s) may be included, for example, within one or more notification messages returned by the browser platform application.

The conversion of a conventional web application by the installer builder to a browser platform application (e.g., based on user-specified parameters), as described above, may include, for example, encapsulating the conventional web application (e.g., provided by an application developer or provider) within a fully-functioning standalone application (e.g., provided by another application or service provider) that operates external to the web browser on a user's device, as previously described. In some implementations, the encapsulated web application invokes various features of a web browser installed at the user's device, while providing its own user interface that is separate from the web browser.

In operation, such a browser platform application functions similarly to a native application executing at the user's device. Thus, from the perspective of the user, there is no difference in the behavior of the application during execution. In some implementations, the generated browser platform application is configured to automatically interface with the user's web browser, without any intervention by the user, so as to provide the intended functionality of the web application. As such, the browser platform application may need to determine whether, for example, at least one (or a particular) web browser is installed at the user's device, e.g., upon initial launch or during installation. The web browser in question may be, for example, a particular web browser that may be needed for supporting the functionality of the particular browser platform application. If, for example, a supported web browser is determined to be missing, the browser platform application may prompt the user with a notification to install the missing browser before attempting to use the application. As previously described, one advantage of the above-described encapsulation technique is that any updates to either the web browser platform application or the web application component may be implemented independently, without requiring any changes be made to the both components.

The web browser features that are invoked by the browser platform application (e.g., as a background process at the user's device) may include, for example, message communication features used to send and receive data communications to and from an associated application server (e.g., server 132 of FIG. 1, as described above) over a network (e.g., network 120 of FIG. 1). Additionally or alternatively, the browser platform application may execute and perform operations solely at the local device, without requiring any network connectivity. Accordingly, the browser platform application installed on the user's device may be configured to operate in various operating modes.

Figure 5A:
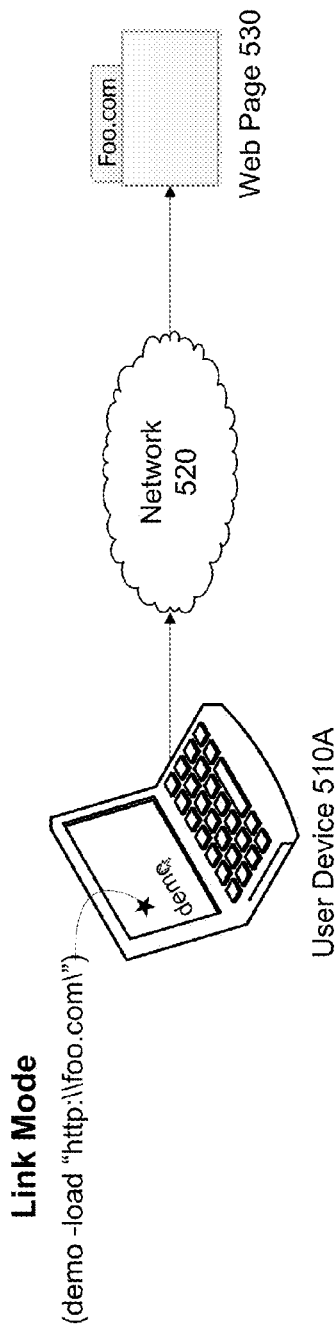
FIGS. 5A, 5B and 5C illustrate example modes of operation for a native browser platform application executable as a standalone application at a computing device.
Figure 5B:
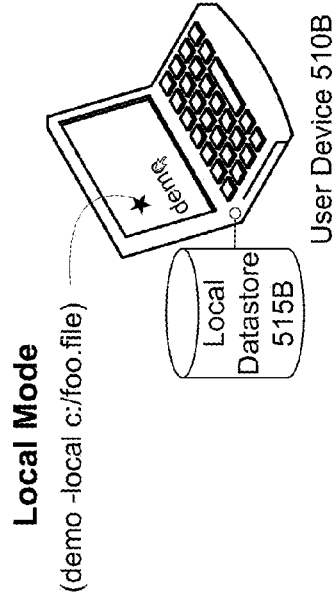
Figure 5C:
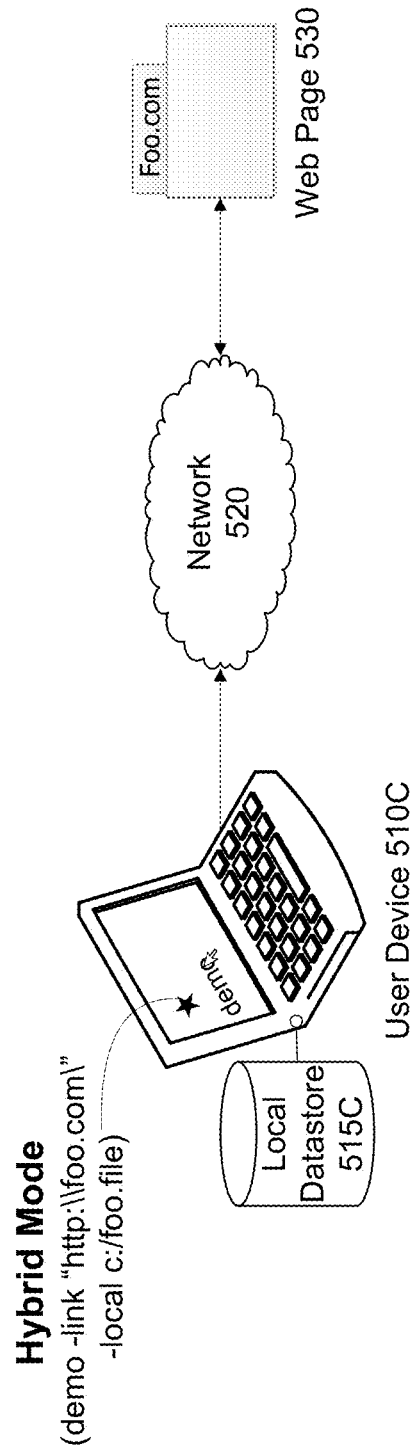

FIGS. 5A-C illustrate different example modes of operation of a browser platform application executable as a native or standalone application at a computing device. The examples of such operating modes may include, but are not limited to: (1) a link mode (e.g., as shown in FIG. 5A), in which the application loads a URL corresponding to the web application (e.g., the URL submitted by the developer to the installer builder); (2) a local mode (e.g., as shown in FIG. 5B), in which the application uses data from a local file stored at the user's device; and (3) a hybrid mode (e.g., as shown in FIG. 5C), which is a combination of the link and local modes.

In some implementations, the browser platform application executable at each user device may be configured to invoke various application-specific features via a command line interface associated with an operating system of the respective user devices 510A, 510B and 510C of FIGS. 5A-5C, respectively, as will be described in further detail below. As such, an example command that may be executed (e.g., either manually by the user or automatically upon application launch) via such a command line interface is shown for each of the above-listed operational modes in FIGS. 5A-5C. Each of user devices 510A, 510B and 510C of FIGS. 5A-C, respectively, may be implemented using any type of computing device including, for example and without limitation, any of clients 110a-c of FIG. 1, as described above. Further, local data stores 515B and 515C of FIGS. 5B and 5C, respectively, may be any type of storage medium for storing information accessible to user devices 510B and 510C, respectively. Although local data stores 515B and 515C are shown in FIGS. 5B and 5C as being separate from user devices 510B and 510C, respectively, it should be noted that local data stores 515B and 515C may be an internal storage device (e.g., hard drive or solid state memory drive) integrated with each user device or may be an external memory device that is communicatively coupled to each user device. Also, network 520 of FIGS. 5A and 5C may be implemented using network 120 of FIG. 1, as described above.

As shown by the example illustrated in FIG. 5A, a client device 510A accesses a web page 530 via a network 520 for a link mode of operation of the browser platform application installed at client device 510A. In this mode of operation, the browser platform application may be configured to use a network link or address (e.g., URL) corresponding to a location of web page 530 such that the browser platform application may access a web application associated with web page 530 via network 520 while it is executed at client device 510A. The network link or location may have been provided by the application developer or end user via the installer builder interface, as described above with respect to FIG. 2 (e.g., via user field 214 of GUI 200 of FIG. 2). In this example, the browser platform application encapsulates the functionality of the particular web application by automatically invoking features (e.g., message communication features) of a web browser installed at client device 510A, as described above, without any user intervention specifically for this purpose. Accordingly, the link mode of operation of the browser platform application, as described herein, enables the functionality of the original web application (e.g., associated with web page 530) to be preserved without having to launch this web application within a web browser, as generally required using conventional techniques.

FIG. 5B illustrates an example of a local mode of operation of a browser platform application. In local mode, the browser platform application operates as any other local application, even in the absence of a network connection. As shown in FIG. 5B, user device 510B includes a local data store 515B. In this example, local data store 515B may include all of the information including, e.g., executable code and data, needed for the browser platform application installed at user device 510B to execute as a native or standalone application, without having to access any information via network 520, as in the link mode example of FIG. 5A.

FIG. 5C illustrates an example of the hybrid mode of operation. As shown in the hybrid mode example of FIG. 5C, a browser platform application executing at user device 510C may be configured to access data for the web application hosted at web page 530 via network 520, as in the link mode example of FIG. 5A, described above. Similar to the link mode of operation, the browser platform application in hybrid mode may be configured with a network address or URL of web page 530, which may be used to access the functionality of the web application via network 520. However, in contrast with the link mode of operation, the web application data accessed from web page 530 via network 520 can be stored locally in a local data store 515C, similar to the local mode of operation. For example, portions of executable code and data for the web application may be stored as a cache file in local data store 515C. The use of such a cache file stored locally at user device 510C may improve application performance and allows the user at device 510C to continue using the functionality of the web application (as encapsulated within the browser-platform application) despite, for example, limited network connectivity.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 6:
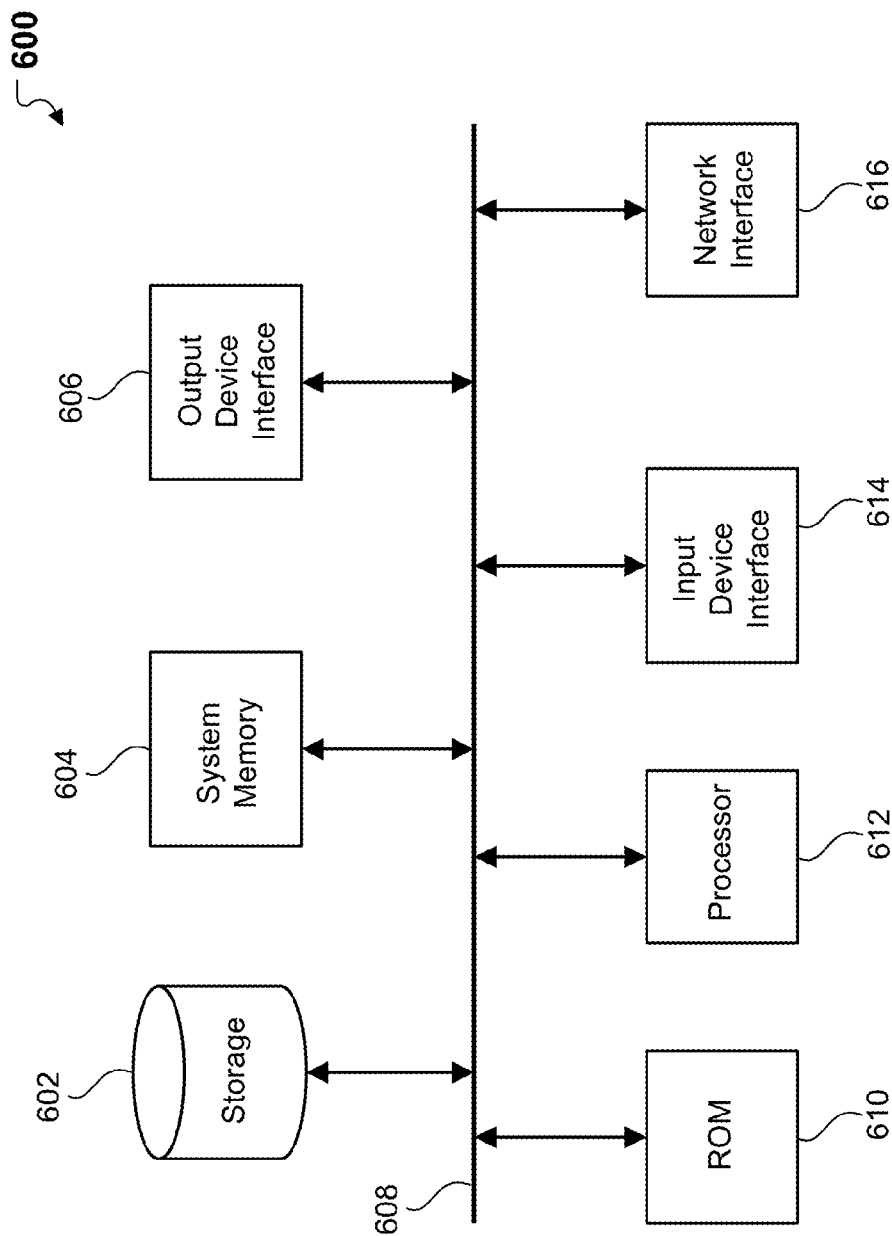
FIG. 6 conceptually illustrates an example electronic system in which portions of the subject technology may be implemented.

FIG. 6 conceptually illustrates an example electronic system in which portions of the subject technology may be implemented. Electronic system 600 can be a computer, phone, PDA, or any other sort of electronic device. Such an electronic system includes various types of computer readable media and interfaces for various other types of computer readable media. Electronic system 600 includes a bus 608, processing unit(s) 612, a system memory 604, a read-only memory (ROM) 610, a permanent storage device 602, an input device interface 614, an output device interface 606, and a network interface 616.

Bus 608 collectively represents all system, peripheral, and chipset buses that communicatively connect the numerous internal devices of electronic system 600. For instance, bus 608 communicatively connects processing unit(s) 612 with ROM 610, system memory 604, and permanent storage device 602.

From these various memory units, processing unit(s) 612 retrieves instructions to execute and data to process in order to execute the processes of the subject disclosure. The processing unit(s) can be a single processor or a multi-core processor in different implementations.

ROM 610 stores static data and instructions that are needed by processing unit(s) 612 and other modules of the electronic system. Permanent storage device 602, on the other hand, is a read-and-write memory device. This device is a non-volatile memory unit that stores instructions and data even when electronic system 600 is off. Some implementations of the subject disclosure use a mass-storage device (such as a magnetic or optical disk and its corresponding disk drive) as permanent storage device 602.

Other implementations use a removable storage device (such as a floppy disk, flash drive, and its corresponding disk drive) as permanent storage device 602. Like permanent storage device 602, system memory 604 is a read-and-write memory device. However, unlike storage device 602, system memory 604 is a volatile read-and-write memory, such a random access memory. System memory 604 stores some of the instructions and data that the processor needs at runtime. In some implementations, the processes of the subject disclosure are stored in system memory 604, permanent storage device 602, and/or ROM 610. For example, the various memory units include instructions for building desktop applications using a web browser platform in accordance with some implementations. From these various memory units, processing unit(s) 612 retrieves instructions to execute and data to process in order to execute the processes of some implementations.

Bus 608 also connects to input and output device interfaces 614 and 606. Input device interface 614 enables the user to communicate information and select commands to the electronic system. Input devices used with input device interface 614 include, for example, alphanumeric keyboards and pointing devices (also called "cursor control devices"). Output device interfaces 606 enables, for example, the display of images generated by the electronic system 600. Output devices used with output device interface 606 include, for example, printers and display devices, such as cathode ray tubes (CRT) or liquid crystal displays (LCD). Some implementations include devices such as a touchscreen that functions as both input and output devices.

Finally, as shown in FIG. 6, bus 608 also couples electronic system 600 to a network (not shown) through a network interface 616. In this manner, the computer can be a part of a network of computers (such as a local area network ("LAN"), a wide area network ("WAN"), or an Intranet, or a network of networks, such as the Internet. Any or all components of electronic system 600 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., "his") include the feminine and neutral genders (e.g., "her" and "its") and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

What is claimed is:

1. A machine-implemented method for building desktop applications using a web browser platform, the method comprising:
   determining a content type and a location of a web application based on input from a user via a first input field;
   retrieving application data for the web application based on the determined content type and location of the web application;
   identifying parameters for a browser platform application to be generated for the web application;
   generating the browser platform application based on the retrieved application data and the identified parameters for the browser platform application;
   embedding at least one unique identifier within the browser platform application being generated so as to track usage of the generated browser platform application, wherein the generated browser platform application is configured to return an initial notification message including the embedded unique identifier upon initial execution of the browser platform application by an end user computing device, at which the generated browser platform application is installed; and
   tracking an end user's interaction with the generated browser platform application upon receiving at least one subsequent notification including the embedded unique identifier from the end user computing device.

2. The method of claim 1, wherein the input from the user via the first input field includes a uniform resource locator (URL) corresponding to the location of the web application.

3. The method of claim 1, wherein the web application corresponds to a browser extension installed for a web browser executable at a computing device of the user, and the input received from the user via the first input field includes a destination of a local data file for the browser extension at the computing device.

4. The method of claim 3, wherein the identifying step comprises:
   receiving at least a portion of the parameters for the browser platform application based on input from the user via one or more second input fields.

5. The method of claim 4, wherein the first and second input fields are provided to the user via an interface on a web page loaded within the web browser executable at the user's computing device.

6. The method of claim 4, wherein the parameters received from the user via the one or more second input fields include a name for the browser application to be generated and a location of an image file to be used as a desktop icon for the browser platform application to be generated.

7. The method of claim 1, wherein the identified parameters for the browser platform application specify at least one type of computing device, and the generating step includes generating at least one installation file for installing the browser platform application at the specified type of computing device.

8. The method of claim 7, further comprising:
   publishing the generated installation file for the browser platform application to an online application distribution service.

9. The method of claim 1, wherein the embedding step comprises:
   generating a user interface for the browser platform application, the generated user interface of the browser platform application including a plurality of user control elements; and
   embedding the unique identifier associated with the browser platform application within one or more of the plurality of user control elements of the generated user interface, wherein the generated browser platform application is further configured to return the at least one subsequent notification message including the embedded unique identifier in response to input received from an end user via the one or more user control elements.

10. The method of claim 9, wherein the embedding step includes embedding a different unique identifier within each of the one or more user control elements, so as to distinguish between each of the one or more user control elements based on the corresponding embedded unique identifier.

11. The method of claim 10, wherein the tracking step comprises:
    tracking the end user's interaction with the one or more user control elements of the user interface of the browser platform application, upon receiving at notification received for the browser platform application.

12. The method of claim 1, wherein the generated browser platform application is configured to execute at a computing device in accordance with a plurality of operating modes.

13. The method of claim 12, wherein the plurality of operating modes includes:
    a link mode in which the browser platform application is configured to retrieve application data from a remote location via a network connection;
    a local mode in which the browser platform application is configured to retrieve the application data solely from a local data store of the computing device; and
    a hybrid mode in which the browser platform application is configured to retrieve a portion of the application data from the remote location via the network connection and store the retrieved portion of the application data in the local data store of the computing device for later access.

14. The method of claim 12, wherein the generated browser platform application is configured to execute at the computing device by interfacing with a web browser executable at the computing device.

15. A non-transitory machine-readable medium comprising instructions stored therein, which when executed by a system, cause the system to perform operations comprising:
    determining a content type and a location of a web application based on input from a user via a first input field;
    retrieving application data for the web application based on the determined content type and location of the web application;
    identifying parameters for a browser platform application to be generated for the web application, based on input received from the user from the user via one or more second input fields;
    generating a user interface including a plurality of user control elements for the browser platform application to be generated;

embedding a unique identifier within at least one of the plurality of user control elements of the generated user interface of the browser platform application to be generated;

generating the browser platform application with the user interface including the embedded unique identifier, based on the retrieved application data and the identified parameters for the browser platform application, wherein the generated browser platform application is configured to return an initial notification message including the embedded unique identifier upon initial execution of the browser platform application by an end user computing device, at which the generated browser platform application is installed; and tracking an end user's interaction with at least one of the plurality of user control elements of the user interface of the generated browser platform application based on a subsequent notification message including the unique identifier received from the end user computing device.

16. The non-transitory machine-readable medium of claim 15, wherein the generated browser platform application is further configured to return the embedded unique identifier upon installation and initial execution of the browser platform application at the user's computing device.

17. The non-transitory machine-readable medium of claim 15, wherein the generated browser platform application is configured to execute at the user's computing device in accordance with a plurality of operating modes.

18. The non-transitory machine-readable medium of claim 17, wherein the plurality of operating modes includes:

a link mode in which the browser platform application is configured to retrieve application data from a remote location via a network connection;

a local mode in which the browser platform application is configured to retrieve the application data solely from a local data store of the computing device; and a hybrid mode in which the browser platform application is configured to retrieve a portion of the application data from the remote location via the network connection and store the retrieved portion of the application data in the local data store of the computing device for later access.

19. A system for building desktop applications from a browser platform, the system comprising:

at least one processor; and a memory device accessible to the processor, the memory device including processor-readable instructions, which when executed by the processor, configure the processor to perform functions to:

determine a content type and a location of a web application based on input from a user via a first input field;

retrieve application data for the web application based on the determined content type and location of the web application;

identify parameters for a browser platform application to be generated for the web application, based on input received from the user from the user via one or more second input fields;

generate a user interface including a plurality of user control elements for the browser platform application to be generated, based on the retrieved application data and the identified parameters, wherein a different unique identifier is embedded within each of the plurality of user control elements of the generated user interface for the browser platform application to be generated;

generate an installation file for an end user to install the generated browser platform application including the user interface with the embedded unique identifier at an end user computing device, wherein the generated browser platform application is configured to return an initial notification message including the embedded unique identifier upon initial execution of the browser platform application by the end user computing device, at which the generated browser platform application is installed; and track the end user's interaction with the browser platform application, upon receiving at least one subsequent notification message including the embedded unique identifier from the end user computing device.

* * * * *